V. DRAPER.

Gem-Setting.

No. 9,154.

Reissued April 13, 1880.

WITNESSES:

Joseph A. Miller Jr.

William L. Roop.

INVENTOR:

Virgil Draper by Joseph A. Miller atty.

N. PETERS, PHOTO-LITHOGRAPHER, WASHINGTON, D. C.

UNITED STATES PATENT OFFICE.

VIRGIL DRAPER, OF NORTH ATTLEBOROUGH, MASSACHUSETTS.

GEM-SETTING.

SPECIFICATION forming part of Reissued Letters Patent No. 9,154, dated April 13, 1880.

Original No. 210,303, dated November 26, 1878. Application for reissue filed September 2, 1879.

*To all whom it may concern:*

Be it known that I, VIRGIL DRAPER, of North Attleborough, in the county of Bristol and State of Massachusetts, have invented certain new and useful Improvements in Jewelry; and I hereby declare that the following is a full, clear, and exact description of the same, reference being had to the accompanying drawings, forming part of this specification.

This invention relates to improvements in jewelry; and it consists in the peculiar construction and arrangement of the jewel clamps or holders, as will hereinafter more fully appear from the following description and claims.

Figure 1:
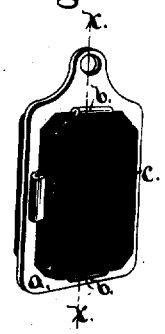
Figure 2:
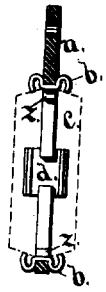
Figure 5:
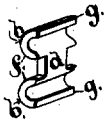
Figure 6:
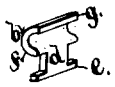
Figure 3:
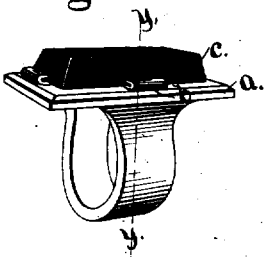
Figure 4:
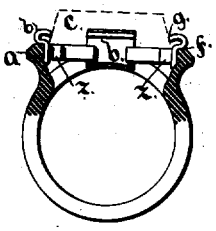

Referring to the drawings, Figure 1 is a perspective view of a charm in which two stones are secured by my improved clamps. Fig. 2 is a sectional view of the charm shown in Fig. 1 through line *x x*, and shows how the clamps may be inserted and made so as to secure two settings. Fig. 3 is a perspective view of a ring in which a stone or gem is secured by my improved clamps. Fig. 4 is a sectional view, through line *y y*, of the ring shown in Fig. 3, and shows how a single stone is secured by these clamps. It also clearly shows how the curved clamp firmly rests on the frame, and, when the edge of the clamp is set against the stone, how firmly the clamp is braced and the stone held. Fig. 5 is a perspective view of the double clamp, and Fig. 6 of the single clamp.

In the drawings, *a* represents the frame of any piece of jewelry; *b*, my improved clamp, which consists in a semicircular curved piece of metal secured so as to rest on the frame at a point marked *f*, so that the stone or gem can be passed between the clamps, (any number of which may be used,) and when the stone is properly placed the edge *g* is pressed firmly against the stone, and by this pressure the portion of the clamp at *f* is also firmly pressed against the frame, and a clamp, even of thin metal, is thus so firmly braced between the frame and the stone that the stone cannot get loose until extra force is exerted, and a stone or gem is thus more firmly secured than in the old manner, and much better displayed. *c* represents a stone or gem.

When two stones or gems are secured to a frame the double clamp shown in Fig. 5 is used. This consists of two clamps united by the piece *d*, which I prefer to set into a slot, *z*, so that the clamps proper form shoulders, and when set against the stone or gem they will be firmly held and the frame and gem firmly secured together.

In the single clamp I provide a shoulder, *e*, to hold the clamp in the frame.

The clamps may be dovetailed or secured in any manner by solder, and instead of forming semi-tubes the clamps may be made of wire of any desired section, curved in a semicircle, and arranged so that when pressed against the stone or gem they will form a curved brace resting on the frame and pressing against the stone or gem, as is clearly shown in Figs. 2 and 4 of the accompanying drawings.

Having thus described my invention, I claim as new and desire to secure by Letters Patent—

1. The combination, with the plate *a*, having any desired number of notches formed on its inner edge, of jewel-clamps each formed with a shank which fits into one of said notches, shoulders on the lower end of the shank which rest against the lower surface of the plate, and the upper end of the clamp being outwardly bent to rest upon the upper surface of the plate, while the upper portion is of semicircular form, substantially as set forth.

2. The combination, with the plate *a*, of jewel-clamps the lower ends of which are secured against the inner edge of said plate, while the upper ends are semicircular in form and rest upon the upper surface of said plate, substantially as set forth.

3. A gem or jewel clamp made with two semicircular clamps, *b*, united by the piece *d*, and arranged to be secured in a slot of the frame so as to hold two stones or gems on opposite sides of the frame, substantially as and for the purpose set forth.

4. The combination, with the plate *a*, of a sheet-metal clamp having its lower end secured to the inner edge of the plate, while its upper portion is bent outward and the upper end bent inward and forced downward against the outward-inclined faces of the jewel, substantially as set forth.

5. As a new article of manufacture, a charm or pendant consisting of a single plate or frame having stones, jewels, or ornaments secured against the opposite sides of said plate by means of clamps inserted into or secured to said plate, thereby forming a double charm or pendant, as described.

VIRGIL DRAPER.

Witnesses:

VIRGIL D. MORSE,

BURRILL PORTER, Jr.